United States Patent [19]

Man et al.

[11] Patent Number: 5,202,938
[45] Date of Patent: Apr. 13, 1993

[54] LAMINATED WAVEGUIDING POLARIZER UTILIZING POLYMERIC BIREFRINGENT CLADDING

[75] Inventors: Hong-Tai Man, Basking Ridge; Joseph Teja, Jr., Edison; Kazutaka Oba, Jersey City, all of N.J.

[73] Assignee: Hoechst Celanese Corp., Somerville, N.J.

[21] Appl. No.: 796,731

[22] Filed: Nov. 25, 1991

[51] Int. Cl.$^5$ .............................. G02B 6/10; G02B 1/08
[52] U.S. Cl. ...................................... 385/11; 385/130; 385/132; 385/142; 359/494
[58] Field of Search ................. 385/11, 130, 132, 142, 385/143, 144, 145, 37; 359/500, 494, 63

[56] References Cited

U.S. PATENT DOCUMENTS 4,384,107  5/1983  Rodgers et al. ............... 528/191 X
4,711,530  12/1987  Nakanowatari et al. ......... 359/74 X Primary Examiner—John D. Lee
Assistant Examiner—S. W. Barns
Attorney, Agent, or Firm—Michael W. Ferrell

[57] ABSTRACT

A waveguiding polarizer utilizing a birefringent polymer film cladding layer is disclosed and claimed. The cladding layer may be a spin-coated polyimide, polyarylate, polyaramide or like polymer. Core and cladding layers are selected so that waveguiding conditions are achieved for light of predetermined polarity, for example, a transverse magnetic mode only.

14 Claims, 1 Drawing Sheet

LAMINATED WAVEGUIDING POLARIZER UTILIZING POLYMERIC BIREFRINGENT CLADDING

TECHNICAL FIELD

The present invention relates generally to polymeric waveguiding polarizers and in preferred embodiments to a polymer waveguiding polarizer utilizing birefringent cladding.

BACKGROUND OF INVENTION

Coherent and/or polarized light is required for a plethora of optical applications such as optical signal processing in communications, optical characterization and like fields. The requirements for light of a specific, predetermined polarity has led to the development of polarizers of various types.

Unexamined Japanese Application No. 164048 discloses a polarizer of the birefringent diffraction grating type employing a lithium niobate substrate and periodic array of proton exchanged regions.

Unexamined Japanese Application No. 162221 discloses a waveguiding polarizer including a refractive index distribution wherein the polarizer portion of the guide is fabricated by way of proton exchange to achieve index differences. A variety of other similar devices may be fabricated in inorganic substances as is taught in Japanese Patent applications 000902 and 300727 (unexamined).

SUMMARY OF INVENTION

In accordance with the present invention, there is provided a polymeric waveguide polarizer which utilizes optically clear, birefringent materials as cladding in devices for the selective waveguiding of light of the preferred polarity, while light of unwanted polarity is extinguished along the optical path. The same is achieved by constructing a laminated waveguide structure having birefringent polymeric cladding such that waveguiding conditions are met for light of the desired polarity.

The birefringent material making up the cladding of the present invention could be of positive or negative optical sign and should have a suitable indicatrix of refraction so that light of the desired polarity is selectively propagated.

BRIEF DESCRIPTION OF DRAWINGS

The invention is described in detail below with reference to the several figures in which.

DETAILED DESCRIPTION

In waveguides it is common to refer to guided modes. The concept of TE and TM modes and their relation to the polarization of linearly polarized light can be described in connection with FIG. 1.

Figure 1:
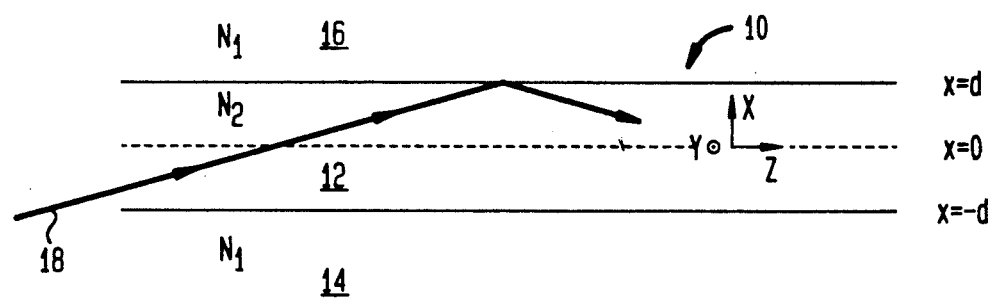
FIG. 1 is a schematic diagram illustrating terminology used in describing the present invention.

FIG. 1 shows a typical schematic representation of a symmetric slab type waveguide 10 having a waveguide core layer 12 of thickness $2d$ with a refractive index $n_2$. The core is an infinite slab in the y direction (out of the paper). About core layer 12 there are two cladding layers 14, 16, both of which are infinite in the x (thickness) and y directions having a refractive index $n_1$. Under typical waveguiding conditions, where $n_2 > n_1$ a light ray 18 propagating in the z direction is confined to core layer 12 by virtue of the index difference $n_2 - n_1$ being suitably positive in sign.

For the waveguiding device of FIG. 1, or for that matter, a three-dimensional waveguiding device, it is typical to solve Maxwell's Equations for two self-consistent types of solutions with respect to the electric and magnetic vectors (E and H, respectively) associated with light which is being guided. The first set of solutions contains only $E_y$, $H_x$, and $H_z$ (subscripts x, y and z referring to the directions indicated on FIG. 1). These are referred to as the transverse electric modes (TE) of the waveguide due to the electric vector component being truly transverse to the direction of propagation. The second set of solutions involves $H_y$, $E_x$ and $E_z$ and are referred to as the transverse magnetic modes (TM) of a waveguide since here the magnetic vector is transverse to the direction of propagation.

A typical "single mode" waveguide has only one permitted (1) TM and one (1) TE such that light propagates through the guide in a single predetermined manner. A polarizer, on the other hand may for instance have one or more TE modes, but no permissible modes in TM so that light is propagated such that only the light which is polarized co-directionally with the TE modes is guided. Light polarized in TM is extinguished if the guide is sufficiently long.

For linearly polarized light, it is typical to refer to the direction of polarization as the vibration direction of the electric field. Thus, as hereinafter referred to light polarized horizontally (y) with respect to film surface will be referred to as light polarized in TE, and light vertically polarized (x) (or perpendicularly to the film surface) will be referred to as light polarized in TM. Naturally, in all but 2 special cases, an incident light beam will be polarized in both TE and TM as referred to above.

Optically isotropic materials exhibit a single refractive index, whereas a birefringent material's refractive properties are direction dependent, typically being described as having an ordinary index with respect to light of a first polarity and an extraordinary index with respect to light of a second polarity perpendicular to the polarization of light of the first polarity noted above. If the extraordinary index is greater than the ordinary index, the material is said to be of positive optical sign, whereas if the ordinary index is smaller than the extraordinary index, the material is said to be of negative optical sign. Either class of materials can be used in accordance with the present invention.

It has been found that laminated waveguides can be fabricated utilizing birefringent cladding layers to selectively guide light of the desired polarity, for instance, linearly polarized light, polarized in TM, while extinguishing an associated TE polarization component of the same light beam. The same is accomplished by fabricating a waveguide where the index difference between core and cladding ($N_2 - N_1$ in FIG. 1) is suitably positive for light of the desired polarity yet will not meet waveguiding conditions for light of the unwanted polarity.

EXAMPLE I

This example describes the synthesis of an azoindoline/methyl methacrylate copolymer useful as a waveguide layer in connection with the present invention. Similar description may be found in U.S. Pat. application Ser. No. 705,426, filed May 24, 1991.

A. Hydroxyethylindoline

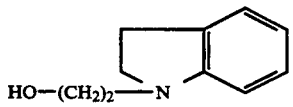

2-Bromoethanol (3 moles) is dissolved in 500 ml of methanol and charged to a round bottom flask reactor equipped with a mechanical stirrer, and sodium iodide (3 moles) is added to the flask contents. Potassium carbonate (3 moles) is added to the mixture and the reaction medium is heated to reflux. Indoline (2 moles) is added to the reaction medium at a slow rate which does not allow foaming. The reaction medium is refluxed for 6 hours, and then stirred at room temperature for about 18 hours.

The product mixture is extracted with ethyl acetate, and the extract solution is passed through silica gel. The solvent is removed under vacuum to provide a residual brown oil. The crude product is purified by Vacuum Distillation at a reduced pressure of 0.15 Torr. The product is collected at 100° C. in a 58% yield (99 mole % purity).

Corresponding indoline compounds are obtained by utilizing 4-bromobutanol or 6-bromohexanol in place of the 2-bromoethanol reactant.

B. 4-(Hydroxyethylindolinylazo)-4'nitrobenzene

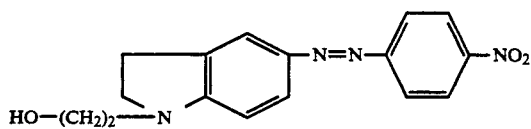

C. Diazonium salt p-Nitroaniline (0.22 mole) is mixed with 170 ml of acetic acid. Fluoboric acid (85 ml) is added to the 4-nitroaniline mixture and the resulting solution is chilled to a temperature below about 10° C.

Sodium nitrite (0.24 mole) is dissolved in water and chilled to below about 10° C. The chilled sodium nitrite solution is added slowly to the reaction medium which maintained the low temperature. The crude diazonium fluoroborate product is collected and washed with propionic acid, and maintained in a wet state with propionic acid.

D. Coupling reaction

The diazonium salt is slurried in 400 ml of propionic acid and chilled. Hydroxyethylindoline (0.18 mole) is dissolved in propionic acid and chilled. The hydroxyethylindoline solution is added slowly to the diazonium salt while maintaining the low temperature (<5° C). The product mixture is stirred for one hour, as the medium warms slowly to room temperature. The product mixture is added to 3000 ml of a 1M sodium acetate solution. The crude product separates as a precipitate, and is collected by filtration. The product is purified by recrystallization from ethyl acetate, mp 166°-168° C. (36% yield; 95 mole % purity).

Corresponding indolinylazo compounds are obtained by substituting 4-cyanoaniline,4-trifluoromethylaniline,4-tricyanovinylaniline or 4-trifluoromethanesulfonylaniline for the 4-nitroaniline reactant.

E. 4-(Methacroyloxyethylindolinylazo)-4'-nitrobenzene

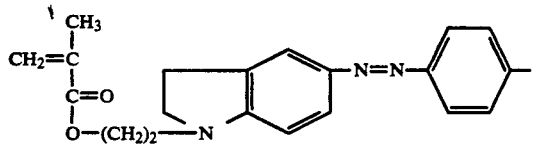

4-(Hydroxyethylindolinylazo)-4'-nitrobenzene (0.1762 mole) is partially dissolved in 1200 ml of ethyl 4-dimethylaminopyridine and methacrylic anhydride (1.2 eq., 0.21 mole) are added, and the solution is heated at 50° C. for 2 hours. An additional 0.1 equivalent of methacrylic anhydride is added to the reaction mixture and heated for another hour.

The resulting product mixture is passed through silica gel, washed with water, and again passed through silica gel. The volume of the product mixture is reduced by evaporating off most of the solvent. The product mixture is poured into hexane, and the crude product which precipitates is collected by filtration. The monomer product is purified by recrystallizing it from acetonitrile/water, mp 130°-133° C. (65% yield; 96 mole % purity).

F.

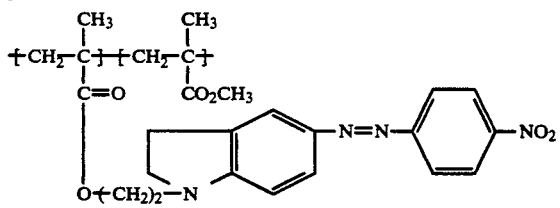

4-(Methacroyloxyethylindolinylazo)-4'4-nitrobenzene (0.0507 mole) is mixed with toluene (100 ml), and the partial solution is purged with nitrogen for thirty minutes in a reactor. Methyl methacrylate (0.0507 mole) and azodiisobutyronitrile (0.001 mole) are added to the solution. The resulting reaction mixture is purged for an additional five minutes. The reactor is immersed in an oil bath (65° C.), and the reaction mixture is stirred for 72 hours.

The polymer product is precipitated by dripping the product solution into a volume of methanol. The crude polymer is purified by dissolving it in tetrahydrofuran and precipitating it in methanol (60% yield). $T_g = 135°$ C., by weight average molecular weight of 58,000. The copolymer has a 56/44 ratio of azo monomer/MMA.

EXAMPLE II

Figure 2:
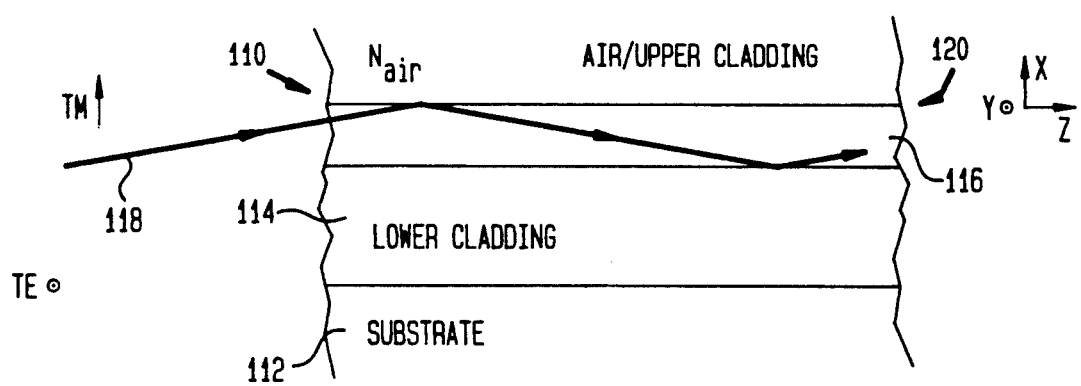
FIG. 2 is a schematic diagram of a slab waveguide polarizing device constructed in accordance with the present invention.

This example illustrates the fabrication of a waveguide polarizer in accordance with the present invention. Referring to FIG. 2, onto a three inch diameter silicon wafer 112 P-16 polyimide solution (Brewer Science) was spin coated at 1000 rpm for 60 seconds to yield a film 114 of about 6 microns in thickness. The film may be dried by various methods, but heat curing for 24 hours at 160° followed by 340° for 4 hours is preferred. This film is believed to be an aromatic polyimide of pyromellitic dianhydride and an aromatic diamine such as 4,4' isopropylenediamine such that the amount of heat curing could effect the amount of polyamide-alcohol present, and hence its refractive index. Onto film 114 there is spin coated a film of the polymer of Example I [see part (F) above, 20% in cyclohexanone] at 1000 rpm for forty five (45) seconds to yield a film 116 of approximately three (3) microns in thickness. This film was also heat cured to drive off solvent for several hours.

At a wavelength of 1.3 microns, cladding film 114 has a refractive index of approximately 1.668 with respect to light polarized in TE and 1.620 with respect to light polarized in TM, thus being strongly birefringent having a $\Delta N$ of 0.048. On the other hand, at the same wavelength, core film 116 has a refractive index of approximately 1.670 with respect to light polarized TE and 1.666 with respect to light polarized in TM, having a $\Delta N$ of 0.004 which for practical purposes is optically isotropic.

The waveguide of this example selectively guides light polarized in TM only since $N_{TM}$ (core) > $N_{TM}$ (cladding) and extinguishes light polarized in TE since $N_{TE}$ (core) ≈ $N_{TE}$ (cladding). Waveguiding conditions are accordingly not met for light polarized in TE.

Thus, a light ray 118 of arbitrary polarization incident on polarizing device 110 is, upon exit at 120 linearly polarized in TM only. In other words, the light exits as vertically polarized by reference to FIG. 2.

The material of core film 116, containing highly polar side groups may be poled in an electric field to change its optical characteristics, if necessary. This is typically accomplished by heating the film in the vicinity of its glass transition temperature while applying a strong electric field as is described in U.S. Pat. No. 4,808,332. This process induces a strong birefringence in sidechain polymers such as those used to form film 116.

EXAMPLE III

Following the procedure of Example II, a similar slab waveguide was fabricated, except that core film 116 was a 50:50 blend of the copolymer of Example I and a 50:50 copolymer of methyl methacrylate and 4[N-(2-methacroyloxyethyl)-N-methylamino]-4'-nitrostilbene as described in U.S. Pat. No. 4,808,332 (ANS/MMA). This film had refractive indices (at 1.3 microns) of 1.650 with respect to light polarized in TE and 1.648 with respect to light polarized in TE. Here again, an incident light ray of arbitrary polarization exited linearly polarized in TM only.

EXAMPLE IV

Following the procedure of Example II, a similar slab waveguide was fabricated except that core layer 116 was formed exclusively of the 50/50 ANS/MMA copolymer noted in Example III. Film 116 had a refractive index (at 1.3 microns) of 1.633 with respect to light polarized in TE and 1.631 with respect to light polarized in TM. This waveguide extinguished light in both TE and TM notwithstanding the fact that $N_{TM}$ (core) > $N_{TM}$ (cladding).

EXAMPLE V

The procedure of Example IV was followed, except that a second spin coating was carried out such that film 116 was of double thickness. This device, unlike Example IV, was operative to polarize light in TM.

EXAMPLE VI

This example illustrates the construction of a rib-type (three-dimensional as opposed to slab type) waveguiding polarizer. A commercially available silicon wafer 212 may be used for waveguiding device 210 as will be appreciated by one of skill in the art. An aluminum or gold strip electrode 214 is patterned to be coextensive with a core portion 216 to be added later. Preferably, the substrate 212 is prepared using an adhesion promoter such as methacryl silane followed by baking at 100° C. so the structure will not delaminate. A lower cladding of Durel TM polyarylate is spin coated to a thickness of about 5 microns. This film 218 (after device is completed) exhibits a refractive index of 1.583 at 1.3 microns with respect to light polarized in the direction of TE and 1.574 with respect to light polarized in the TM direction at the same wavelength. Durel TM polyarylate is available from Hoechst Celanese Corporation, 86 Morris Avenue, Summit, N.J. and is a terpolymer of terephthalic acid, isophthalic acid and bisphenol-A.

Figure 3:
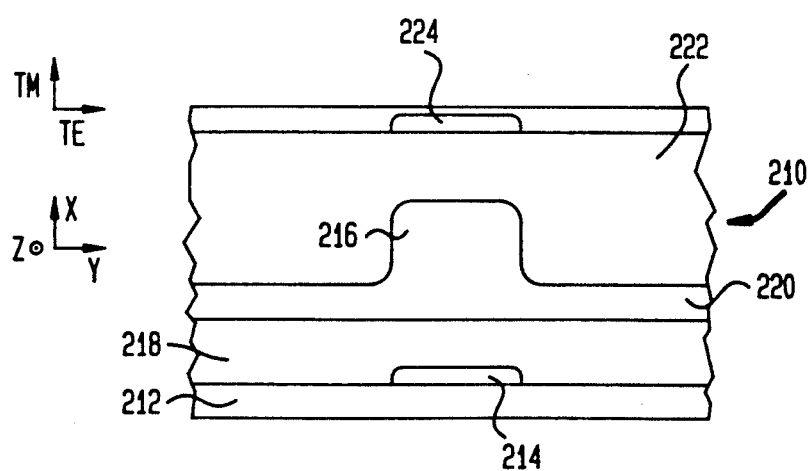
FIG. 3 is a schematic diagram in section of a channel waveguide constructed in accordance with the present invention. Throughout the figures Cartesian axes x, y and z are designated in consistent direction.

Atop film 218 there is coated a relatively thick layer 220 of a sidechain polymer generally having an unpoled index in the range of about 1.540 to about 1.60 so that after electropoling its index with respect to light polarized in TE is less than 1.583 and its index with respect to light polarized in TM is greater than 1.574 is applied. Layer 220 is subsequently patterned to have a protruding rib 216 as shown in FIG. 3. Any sidechain polymer meeting the above criteria may be selected. These types of polymers are generally described in U.S. Pat. No. 5,002,361 of DeMartino et al.

A second cladding layer 222 of Durel TM polyarylate is added together with an electrode 224 and a protective layer 226 if so desired. Device 210 can be heated in the vicinity of its glass transition temperature while a voltage is applied to electrodes 214, 224 and allowed to cool while the field is still on to freeze the induced birefringence into film 220. The refractive index of core portion 216 will, upon such electropoling, change so that it may waveguide with respect to light polarized in TM, only. The polarizing characteristics of device 210 can thus be tuned by poling the NLO active core 216 since such polymers change their birefringence upon poling in an electric field.

EXAMPLE VII

A polymer film of the Durel TM polyarylate of Example VI was spin-coated on a silicon substrate to a thickness of 2.3 microns. This film exhibited a refractive index (at 1.3 microns) of 1.585 with respect to light polarized in TE and 1.567 with respect to light polarized in TM. Thus, the film was nearly twice as birefringent ($\Delta N = N_{TE} - N_{TM}$) as the much thicker polyarylate film of Example VI.

From the foregoing, it should be clear that a necessary (but not necessarily sufficient) condition for polarizing in accordance with the present invention is that $N_{M1 core} - N_{M1 cladding}$ is >0 where $N_{M1}$ is the refractive index of the respective layer with respect to a given mode $M_1$. The corresponding difference for the orthagonal mode $M_2$ may be negative, or the difference small enough with a given set of dimensions such that the device will not guide light polarized in $M_2$ so that it is extinguished. In a typical case, $M_1$ could be light polarized in the vertical direction with respect to the film surface (TM) and M₂ light polarized in the direction parallel to the film surface (TE).

To achieve the appropriate conditions, at least one birefringent cladding layer is utilized. This requires a significant birefringence ($\Delta N = NT_E - N_{TM}$) in the cladding layer. In general, the $\Delta N$ values should be at least about 0.005 to about 0.5; typically from about 0.0075 to about 0.1; and preferably from about 0.01 to about 0.05 at wavelengths of interest. While this has been illustrated in connection with an aromatic polyimide hereinabove, similar properties may be achieved using polyimides formed of the following diamines and dianhydrides:

m- and p-phenylenediamine,
2,4- and 2,6-diaminotoluene,
p- and m-xylylenediamine,
4,4'-diaminobiphenyl,
4,4'-diaminodiphenyl ether,
4,4'-diaminobenzophenone,
4,4'-diaminophenyl sulfone,
4,4'-diaminodiphenyl sulfide,
4,4'-diaminodiphenylmethane,
3,3'-dimethylbenzidine,
4,4'-isopropylidenedianiline,
1,4-bis(p-aminophenoxy)benzene,
1,3-bis(p-aminophenoxy)benzene,
hexa-, hepta-, nona-, and decamethylenediamines,
1,4-cyclohexanediamine,
bis(4-aminocyclohexyl)methane,
pyromellitic dianhydride,
benzophenone dianhydride,
2,2-bis(3,4-dicarboxyphenyl)propane dianhydride,
3,3',4,4'-biphenyltetracarboxylic acid dianhydride,
bis(3,4-dicarboxyphenyl) ether dianhydride,
bis(3,4-dicarboxyphenyl) thioether dianhydride,
bisphenol A bisether dianhydride,
2,2-bis(3,4-dicarboxylphenyl)hexafluoropropane dianhydride,
  2,3,6,7-naphthalenetetracarboxylic acid dianhydride,
  bis(3,4-dicarboxyphenyl) sulfone dianhydride.
so long as the material is optically clear at the wavelengths of interest.

Moreover, while aromatic polyarylates have been shown above, polymers such as:
aromatic polyamides
polyamide-imides
polybenzimidazoles
polybenzoxazoles
aromatic polyesters
polyetherimides
polyetherketones
polyethersulfones
polyimidesulfones
are likewise useful. Indeed, many aromatic polymers maybe used.

While the invention has been exemplified for purposes of illustration, the foregoing in no way limits the scope of the present invention which is further described by the appended claims.

What is claimed is:

1. A laminated waveguiding polarizer for emitting linearly polarized light upon irradiation with a light beam of arbitrary polarization comprising in combination a waveguide core layer which is substantially optically transparent adjacent a birefringent polymer film cladding layer, the refractive indices of said core layer and said cladding layer being selected so that the layers of the polarizer will cooperate to selectively guide light of a predetermined linear polarization and extinguish polarization components orthagonal thereto wherein said core layer is formed of a polymer having sidechains with a dipole moment such that the core material changes its refractive properties upon poling in an electric field at the vicinity of the glass transition temperature of the polymer.

2. The polarizer according to claim 1, wherein the polarizer selectively guides light linearly polarized in a direction perpendicular to the birefringent cladding layer film surface.

3. The polarizer according to claim 1, wherein the polarizer selectively guides light linearly polarized in a direction parallel to the birefringent cladding layer film surface.

4. The polarizer according to claim 1, wherein the birefringent cladding layer is produced by spin coating a polymer solution onto the surface of a substrate.

5. The polarizer according to claim 4, wherein the birefringent cladding layer is formed from an aromatic polymer.

6. The polarizer according to claim 1, wherein the birefringent cladding layer is formed of an aromatic polymer.

7. The polarizer according to claim 6, wherein the birefringent cladding layer is formed from a polymer selected from the group consisting of aromatic polyimides and polyarylates.

8. The polarizer according to claim i, wherein the birefringent cladding layer is formed from a polymer selected from the group consisting of:
  aromatic polyamides, polyamide-imides, polybenzimidazoles, polybenzoxazoles, aromatic polyesters, polyetherimides, polyetherketones, polyethersulfones, polyimidesulfones, and polysulfones.

9. The polarizer according to claim 1, wherein the sidechains of said core layer polymer are nitroazobenzene sidechains.

10. The polarizer according to claim 1, wherein the sidechains of said core layer polymer are nitrostilbene sidechains.

11. The polarizer according to claim 1, wherein the sidechains of said core layer polymer include a conjugated Π electron system.

12. The polarizer according to claim 1, wherein said birefringent film exhibits a birefringence of at least about 0.005.

13. The polarizer according to claim 1, wherein said birefringent film exhibits a birefringence of at least about 0.0075.

14. The polarizer according to claim 1, wherein said birefringent film exhibits a birefringence of at least about 0.01.

* * * * *